(12) United States Patent
Baker et al.

(10) Patent No.: US 9,943,146 B2
(45) Date of Patent: Apr. 17, 2018

(54) COMPRESSION MOLDED SILICONE RING

(71) Applicant: QALO LLC, Los Angeles, CA (US)

(72) Inventors: Patrick Baker, Los Angeles, CA (US); Kyle Holiday, Tustin, CA (US)

(73) Assignee: Qalo LLC, Santa Ana, CA (US)

( * ) Notice: Subject to any disclaimer, the term of this patent is extended or adjusted under 35 U.S.C. 154(b) by 264 days.

(21) Appl. No.: 14/798,871

(22) Filed: Jul. 14, 2015

(65) Prior Publication Data

US 2016/0345692 A1 Dec. 1, 2016

Related U.S. Application Data

(63) Continuation-in-part of application No. 29/528,173, filed on May 27, 2015, now Pat. No. Des. 789,232.

(51) Int. Cl.
| | |
|---|---|
| *A44C 27/00* | (2006.01) |
| *B29C 43/20* | (2006.01) |
| *B29C 43/02* | (2006.01) |
| *B29C 43/14* | (2006.01) |
| *B29K 83/00* | (2006.01) |

(Continued)

(52) U.S. Cl.
CPC .......... *A44C 27/001* (2013.01); *B29C 43/027* (2013.01); *B29C 43/146* (2013.01); *B29C 43/203* (2013.01); *A44C 9/0023* (2013.01); *B29C 43/145* (2013.01); *B29C 2043/148* (2013.01); *B29K 2083/00* (2013.01); *B29K 2083/005* (2013.01); *B29L 2031/743* (2013.01)

(58) Field of Classification Search
CPC ............ B29C 43/027; B29C 2043/148; B29C 2043/147; B29C 43/146; B29C 43/203; B29C 43/145; A44C 27/001; A44C 9/0023; Y10S 264/67; Y10S 277/922
USPC ........ 63/DIG. 3, 11, 15, 15.7; 264/326, 262, 264/325, 320, DIG. 67; 29/8; 249/57
See application file for complete search history.

(56) References Cited

U.S. PATENT DOCUMENTS

| | | | | |
|---|---|---|---|---|
| 2,717,024 A | * | 9/1955 | Ulrich .................... | F16J 15/328 156/245 |
| 2,717,025 A | * | 9/1955 | Ulrich .................. | B29C 43/006 156/293 |

(Continued)

OTHER PUBLICATIONS

QALO LLC.; Men's Thin Red Line Silicone Ring: Apr. 8, 2015; retrieved on Sep. 14, 2016 <https://web.archive.org/web/20150408035026/http:/qalo.com/collections/thin-line/products/mens-thin-line-collection>.

(Continued)

*Primary Examiner* — Jack W Lavinder
(74) *Attorney, Agent, or Firm* — Gabriel & Pelaez, PLLC; Michael G. Gabriel (57) ABSTRACT

A method of manufacturing a silicone ring consisting of two outer-band halves formed by compression silicone-molding in a first mold and an inner-band formed by placing half of the outer-bands of the ring in a second mold, placing a spacer-insert mold over the second mold, inserting a silicone rubber in the cavities of a spacer-insert mold, inserting the remaining outer-band halves into a fourth mold, inserting the three molds into a compression chamber to vulcanize the outer-band halves and the inner-band together, wherein the first and second outer-bands form a complete ring, and a symmetrical inner-band is formed in between the first and second outer-band halves.

11 Claims, 7 Drawing Sheets

(51) Int. Cl.
*B29L 31/00* (2006.01)
*A44C 9/00* (2006.01)

(56) References Cited

U.S. PATENT DOCUMENTS

| | | | | |
|---|---|---|---|---|
| 2,859,061 A * | 11/1958 | Reid | ...................... | F16J 15/328 |
| | | | | 156/213 |
| 4,292,269 A * | 9/1981 | Hock | ................. | B29D 99/0053 |
| | | | | 249/157 |
| 5,614,225 A * | 3/1997 | Volpi | ...................... | B29C 44/58 |
| | | | | 425/28.1 |
| 8,567,103 B2 * | 10/2013 | Wolf | .................... | A44C 5/0015 |
| | | | | 40/306 |
| 2010/0192955 A1 | 8/2010 | Biener et al. | | |
| 2010/0312276 A1 | 12/2010 | Schofield et al. | | |
| 2011/0289966 A1 | 12/2011 | Ahrenholtz et al. | | |
| 2012/0118016 A1 | 5/2012 | Maloney et al. | | |
| 2012/0148655 A1 | 6/2012 | Variano et al. | | |
| 2013/0091895 A1 | 4/2013 | Hwang | | |

OTHER PUBLICATIONS

International Search Report and the Written Opinion of the International Searching Authority, dated Oct. 4, 2016, 9 pages.

* cited by examiner

COMPRESSION MOLDED SILICONE RING

RELATED APPLICATIONS

This U.S. patent application claims priority to U.S. patent application Ser. No. 29/528,173, filed May 27, 2015, entitled "Wearable Ring," where this application is incorporated by reference as if fully set forth herein.

TECHNICAL FIELD

Certain aspects of the disclosure relate to a method of manufacturing a silicone ring. In particular, the disclosure relates to the manufacture of a ring composed of three components that form a thin-line segment around the entire circumference of the ring.

BACKGROUND

Wedding rings or wedding bands have customarily been worn by both men and women throughout history. The ring is normally worn on the base of the left or right "ring" finger. One possible reason the "ring" or fourth finger on the left hand is the chosen location for wearing a ring is that the likelihood of injury is minimized. Humans are predominately right handed and wearing a wedding ring on the left hand on the fourth finger likely results in a decreased amount of injuries and less wear and tear on the ring itself. Typically, wedding rings are made of precious metals such as gold, silver, palladium, and platinum. Other examples include those rings made out of titanium, tungsten, ceramic, etc. Certain occupations and active lifestyles are not conducive to the wearing of a wedding band. Serious injury can result to the finger and hand if a conventional wedding ring gets caught on an object. Many individuals remove their rings for safekeeping, only to find that after completing work or other activity the ring has been misplaced, lost, or even stolen. The current disclosure describes a silicone ring and the process of making the silicone ring as a viable replacement to conventional wedding bands.

To alleviate the hazards and risks associated with the wearing of a conventional wedding band, a ring manufactured by silicone compression-molding virtually eliminates all potential risks of injury to the hand and finger. The silicone ring also provides a cost effective alternative to those who desire to wear a wedding ring continuously and a ring that will not interfere with an active lifestyle. Silicone rubber is widely known to be resistant to extreme temperatures, is resistant to abrasions, is resistant to chemicals, is resistant to weather, is hypoallergenic, is comfortable to wear, and is less harmful to the environment than many organic rubbers.

Conventional methods of compression molding can produce various flaws in the component characteristics such as color loss and discoloration, surface texture blisters and waviness, and optical distortion. Conventional compression molding methods are incapable of producing a thin-line ring of the current disclosure. The particular method of manufacturing developed in the current disclosure eliminates many of the common problems found in conventional methods of making compression-molded products. The compression molding process described herein achieves a symmetrical inner-band that runs through the entire circumference of the ring. The disclosed compression molding methods include critical steps, specific temperatures, pressures, compression times, material requirements, etc. to achieve a symmetrical inner-band. Without the disclosed process, the edges of the two outer-band halves and the edges of the inner band that could not be controlled or defined by other known methods.

SUMMARY

This Summary provides an introduction to some general concepts relating to this disclosure in a simplified form that are further described below in the Detailed Description. This Summary is not intended to identify key features or essential features of the disclosure.

Certain aspects of the present disclosure relate to a unique compression-molded silicon ring, or methods of making such rings. In accordance with one exemplary aspect of the disclosure, an outer-band or a first outer-band half or half of a ring hoop is formed through compression molding. A matching second outer-band half or half of a ring hoop is then formed by compression molding. The outer-band half is placed in a second mold and a spacer-insert mold is placed over the second mold. The spacer-insert mold contains a cavity for each ring template that is filled with a silicone rubber, silicone dough, or silicone shot. A second outer-band half of the ring is placed a fourth mold. The fourth mold is placed over the spacer-insert mold. All three-conjoined molds are inserted into a compression chamber. The two outer-band halves are compression molded into a single ring with an inner, thin-line band formed by the spacer-insert mold that was filled with silicone rubber.

In another exemplary embodiment of the disclosure, a thin-line silicone ring is described. The silicone ring consists of two outer-band halves that are joined to form a single band. The two outer-band halves are separated by a silicone inner band. The silicone inner band is symmetrical throughout the entire circumference of the outer band and is positioned equidistantly in between the two outer-band halves. The inner silicone-band can typically be composed of a grade of material that is the same or different than the outer band, and typically a different color.

BRIEF DESCRIPTION OF THE DRAWINGS

Exemplary embodiments of the disclosure will now be described by way of example only and with reference to the accompanying drawings, in which.

DETAILED DESCRIPTION OF EMBODIMENTS

In the following description of various examples of a compression-molded silicone ring and methods of manufacture in this disclosure, reference is made to the accompanying drawings, which form a part hereof.

It is to be understood that other compression-molded silicone rings and methods of manufacture may be utilized and that structural and functional modifications may be made from the specifically described examples and methods without departing from the scope of the present disclosure. Moreover, the figures of this disclosure may represent the scale and/or dimensions according to one or more embodiments, and as such contribute to the teaching of such dimensional scaling. However, those skilled in the art will readily appreciate that the disclosure herein is not limited to the scales, dimensions, proportions, and/or orientations shown in the figures.

The embodiments and methods described herein provide, inter alia, a compression-molded silicone ring and the method of manufacturing. The compression-molded silicone ring is unique and may be used as a substitute to a conventional wedding band. The compression-molded silicone ring provides a safe alternative to individuals with active lifestyles or professions not conducive to the wearing of conventional rings or wedding bands due to the risk of injury to the finger and hand.

The design of the compression-molded silicone ring and associated process of manufacturing result in a ring design that includes a nearly symmetrical inner band or "thin line" that runs through the circumference of the ring. Two outer bands "sandwich" the inner band and results in a visually appealing ring. In one embodiment, the inner band has a different color and/or made from a different grade of silicone rubber than the outer bands. In yet another embodiment, the outer bands are multi-colored and/or made from different grades of silicone rubber.

Figure 1:
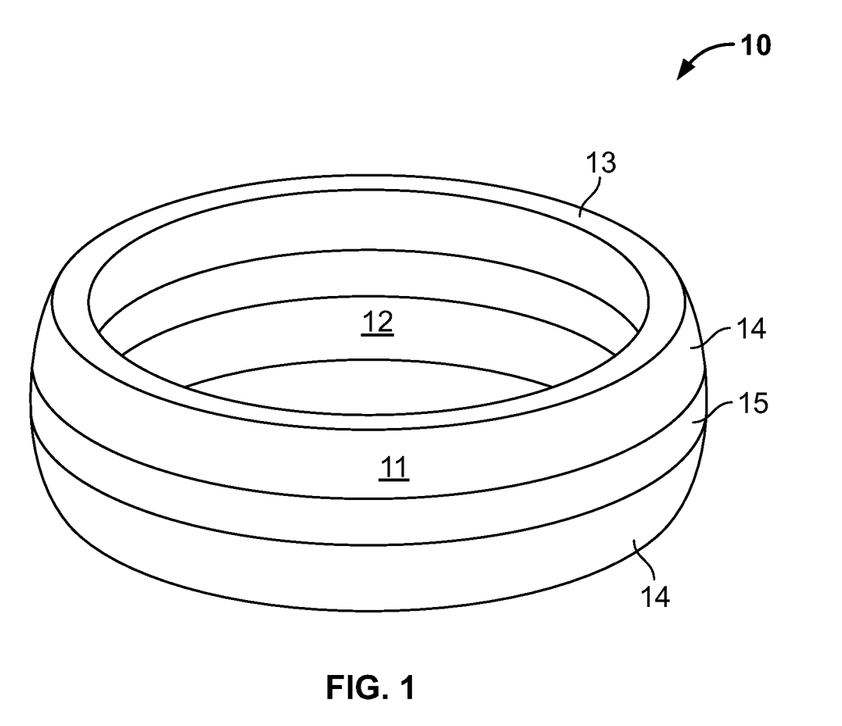
FIG. 1 shows a raised horizontal view of an exemplary embodiment of a compression-molded silicone ring.
Figure 2:
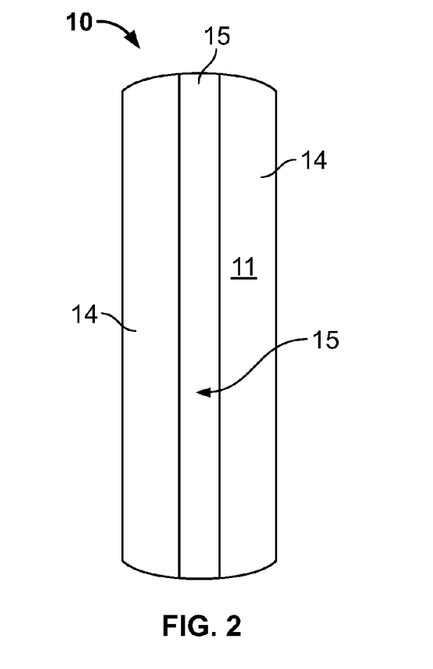
FIG. 2 shows a front and vertical view of an exemplary embodiment of a compression-molded silicone ring.
Figure 3:
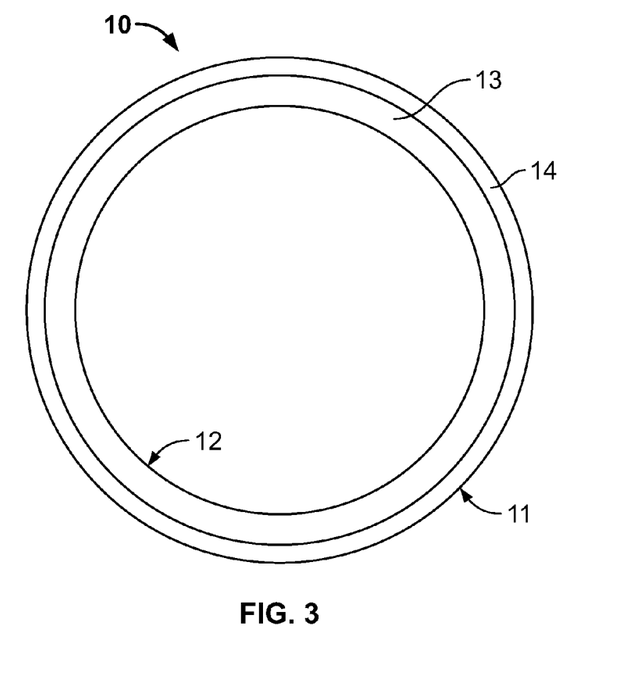
FIG. 3 shows a top view from directly above an exemplary embodiment of a compression-molded silicone ring.

In certain examples, such as the examples of FIGS. 1, 2, and 3, the compression-molded silicone ring 10 comprises the compression-molded silicone ring includes at least two outer-band halves 14. The first outer-band half 14 and second outer-band half 14 are separated by a silicone inner-band 15. The outer surface 11 of the silicone ring is formed by the outer surfaces of two outer-band halves 14 and the outer surface of the inner-band 15. The inner portions of outer-band halves 14 and inner-band 15 also form the inner surface 12 of the silicone ring. The silicone ring 10 also includes a flat edge 13 that is part of the outside structure of outer-band 14.

In certain examples, the inner band 15 is positioned between outer-band halves 14, in the exact center of the ring, such that the width of the first outer-band half 14, as seen in FIG. 2, is the same width as the second outer-band half 14. In other examples, as seen in FIG. 2, the width of inner-band 15 is less than the width of outer-band half 14. In yet other examples, the width of inner-band 15 is greater than the width of outer-band halves 14. In still other examples, the inner-band 15 has the same width of outer-band halves 14. In each example, the uniform inner-band 15 follows or runs the entire circumference of the silicone ring outer-bands 14.

In some examples, the inner-band 15 is a different color than the outer-band halves 14. In other examples, a first outer-band half has a different color than the inner-band half 15, and a different color than the second outer-band half 14. In this embodiment, the silicone ring is composed of three different colors.

Silicone rubber is an elastomer composed of silicone, carbon, hydrogen, and oxygen. Silicone rubbers have a vast amount of uses across various industries and have inherently stable properties. Silicone rubber is non-reactive and are virtually unaffected by weather, can withstand temperatures from roughly −50° Celsius to +250° Celsius. Silicone rubber tends to maintain its flexibility and resilience, is inert with no taste or smell, and can range from transparent to brightly colored. Due to these advantageous properties, silicone rubber has applications in the automotive industry, apparel, medical devices, electronics, the food industry, etc. Various grades of silicone rubber are commercially available such as Medical grade, Food Quality/FDA compliant grades, High-Temperature Vulcanizing (HTV) grade, Room Temperature Vulcanization (RTV) grade, Liquid Silicone Rubber (LSR), 2-Part Silicone Rubber (RTV-2), Silicone Rubber (RTV-1), and silicone gels. HTV is further divided into millable type silicone rubber and liquid type silicone rubber based upon the degree of polymerization. Millable type silicone rubber is generally composed of polyorgarnosilioxan and silica that forms a base compound. The base compound is catalyzed, pigmented, and cured and is readily available as a commercial product. This type of silicone rubber is also known as High Consistency Silicone Rubber (HCR). In certain examples, the outer-band half 14 is composed of a food grade silicone rubber. In other examples, the inner-band 15 is composed of a food-grade silicone rubber. In still other examples, the outer-band halves 14 and the inner-band 15 can be made of any combination of silicone rubbers described above, or silicone rubbers not described or developed yet.

Figure 4:
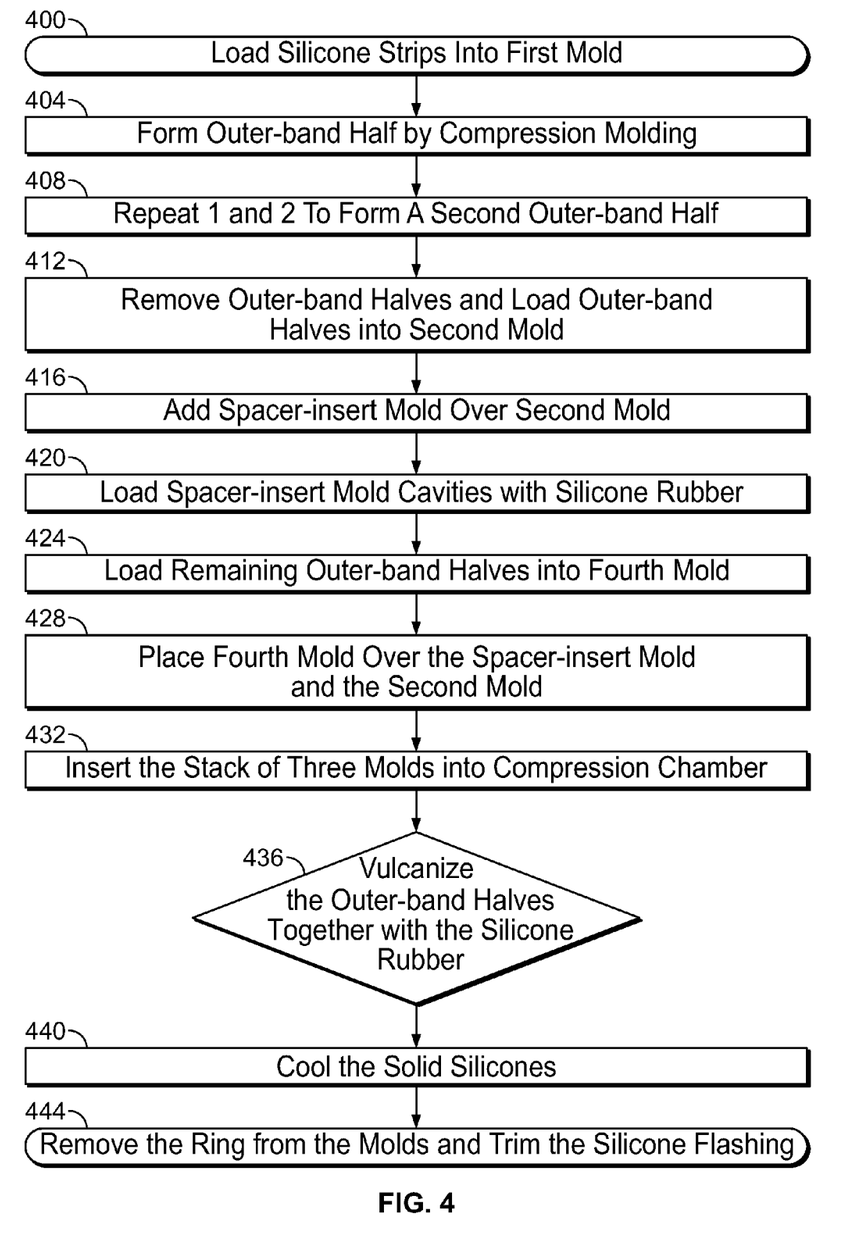
FIG. 4 shows the specific process steps for making an exemplary embodiment of a compression-molded silicone ring.

Some aspects of the disclosure relate to a method of manufacturing a silicone ring via compression-molding process. The method takes advantage of the properties of silicone rubber that include fast-curing and low compression set times. Solid silicone rubber is vulcanized in molds by heat and pressure. FIG. 4 shows the main steps of the method of manufacturing the compression-molded silicone ring. In one example, food-grade HCR strips are loaded into a first mold 400 that will form the outer-band halves by compression molding in step 404. This is repeated twice as shown by step 408 to produce two outer-band halves that form the compression-molded silicone ring. In one example, the outer-band halves formed by steps 400-408 are made from the same grade of silicone rubber. In another example, a different grade of silicone rubber is used when the second set of outer-band halves are formed in step 408. In certain examples, the color of the outer-band halves are the same. In other examples, the outer-band halves used to form the silicone ring 10 are different colors. Using a different grade of silicone rubber for the two outer-band halves provides further options to alter the texture and/or appearance of the ring.

The outer-band halves are then removed from the first mold and inserted into a second mold as described in step 412. Step 416 requires that a spacer-insert mold, which helps form the inner-band, be placed over the second mold. In step 420 the spacer-insert mold cavities are loaded with silicone rubber, silicone material, or a silicone dough. The remaining outer-band halves are loaded into a fourth mold in step 424. Step 428 requires that the fourth mold be placed over the spacer-insert mold and the second mold, and then the stack of three molds is inserted into a compression chamber in step 432. In step 436, the outer-band halves and the inner-band silicone rubber are vulcanized together and then cooled in step 440. The finished silicone ring is removed from the molds in step 444 and any excess silicone material or flash is trimmed from the final product.

Each cavity in the compression molds are individually filled with a precisely weighed amount of silicone rubber or preloaded with strips or pieces of silicone rubber. The compression presses, generally, are hydraulically operated and heated with steam or electrically. Temperature of the mold during the vulcanization process plays a critical role in properly forming the silicone ring. High temperatures are required to minimize the vulcanization time, but temperatures that are too high can result in the "scorching" of the silicone rubber. The vulcanization time is determined by the temperature of the selected silicone material, size or thickness of the component being produced, and the temperature of the molds.

In certain examples, various ring sizes are produced by the methods of the current disclosure and require a variable amount of silicone rubber to produce the outer-band half. The desired thickness of the outer-band half will also determine the amount of silicone rubber required. In one example, 1.00-1.25 grams of silicone rubber are used to form the outer-band half. In other examples, 0.75-1.50 grams of silicone rubber are used to form the outer-band half. In yet another example, 0.50-1.75 grams of silicone rubber are used to form the outer-band half. In still another example, 0.25-3.25 grams of silicone rubber are used to form the outer-band half.

Different amounts of silicone rubber are required due to the various ring sizes that are produced by the methods of the current disclosure. The desired thickness of the outer-band halves will also determine the amount of silicone rubber required in the current method. Additionally, different amounts of silicone rubber are required to produce the inner-band, depending upon the ring size as well as the desired thickness of the inner band. In one example, 2-2.5 grams of silicone rubber are used to fill the spacer-insert mold cavities. In other examples, 1.75-2.75 grams of silicone rubber are used to fill the spacer-insert mold cavities. In yet another example, 1.5-3.0 grams of silicone rubber are used to fill the spacer-insert mold cavities. In still another example, 1.0-4.0 grams of silicone rubber are used to fill the spacer-insert mold cavities.

Non-uniform heating and temperatures that are too high commonly lead to blistered compression-molded products, an overly thick flash, dull and clouded color, warped structures, undefined borders, and bleeding colors. Molds that are too cold can also result in blistered components or dull finishes. In certain examples, in an effort to eliminate flaws due to inadequate process temperatures, the compression molds are heated to 200° Celsius in the vulcanization process. In other examples, the molds are heated from 190° Celsius to 210° Celsius. In yet another example, the molds are heated from 185° Celsius to 215° Celsius. In one example, the molds are heated from 175° Celsius to 225° Celsius.

Insufficient compression time or mold cycles can result in blistering, uncured silicone, and warping. To prevent flaws in the components as a result of incorrect compression times or mold cycles, in one example, the mold compression time is 3 minutes. In other examples, the mold compression time is between 2.5 and 3.5 minutes. In yet another example, the mold compression time is between 2.0 and 4.0 minutes. In still another example, the mold compression time is between 0.5 and 5.0 minutes.

Blistering, surface clouding, color segregation, and weak components can result from improper compression pressures. To eliminate problems associated with improper compression pressures, in one example, the mold compression pressure to form the outer-band half is 200 kg/cm$^2$. In other examples, the mold compression pressure to form the outer-band half is between 175 kg/cm$^2$ and 225 kg/cm$^2$. In yet another example, the mold compression pressure to form the outer-band half is between 150 kg/cm$^2$ and 250 kg/cm$^2$. In still another example, the mold compression pressure to form the outer-band half is between 125 kg/cm$^2$ and 275 kg/cm$^2$. In one example, the mold compression pressure to form the outer-band half is between 100 kg/cm$^2$ and 300 kg/cm$^2$.

As discussed above, to eliminate problems associated with improper compression pressures, the mold compression pressure to form the inner-band in one example is 120 kg/cm$^2$. In other examples, the mold compression pressure to form the inner-band is between 110 kg/cm$^2$ and 130 kg/cm$^2$. In yet another example, the mold compression pressure to form the inner-band is between 100 kg/cm$^2$ and 150 kg/cm$^2$. In still another example, the mold compression pressure to form the inner-band is between 50 kg/cm$^2$ and 200 kg/cm$^2$.

Figure 5A:
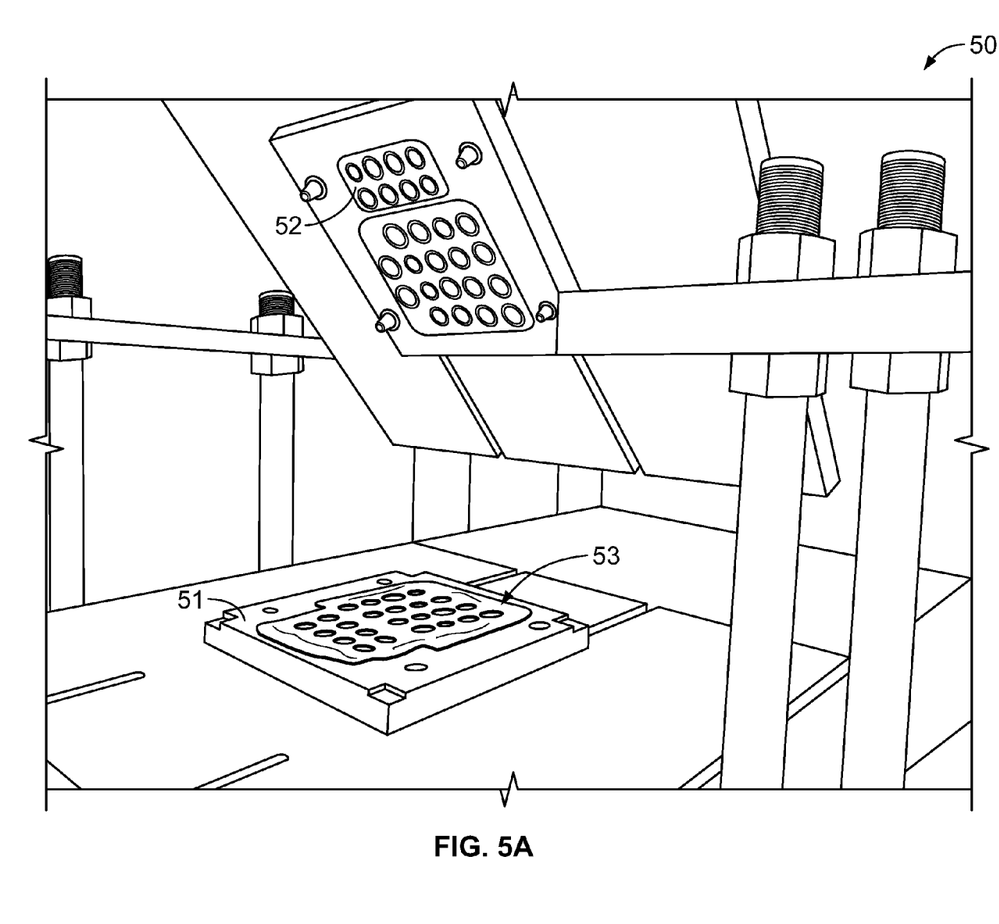
FIG. 5A-5B shows the first compression mold and the formed outer-band halves of an exemplary embodiment of a compression-molded silicone ring.
Figure 5B:
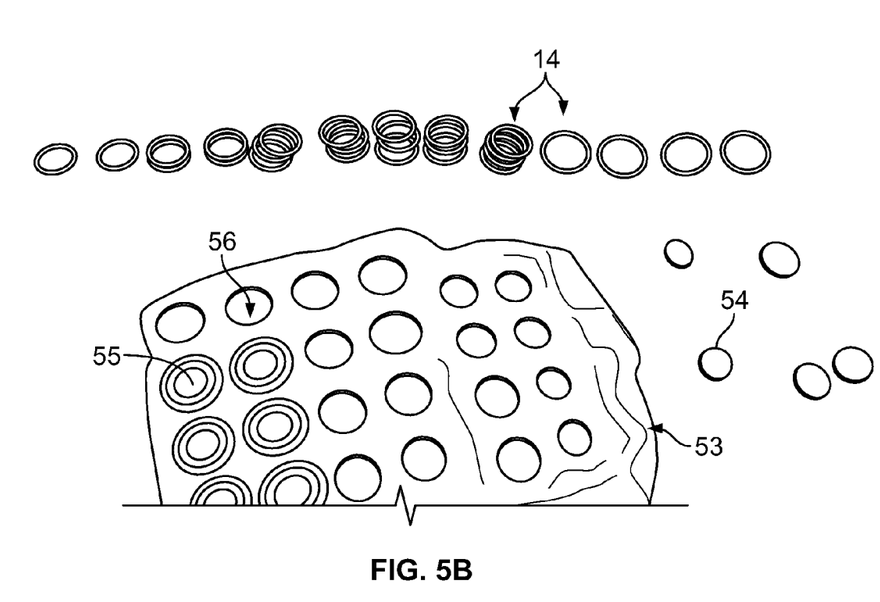

In some exemplary embodiments, such as the exemplary embodiment of FIG. 5A, a first compression mold 50 of the method of manufacturing is depicted. The compression mold 50 includes a base plate 51 and top plate press 52. In one example, silicone strips are loaded into the first compression mold 50 that will form a first set of outer-band halves by compression molding. Silicone rubber or silicone material 53 is loaded on the base plate 51 of the first compression mold 50. A first set of outer-band halves are formed by compressing the top plate press 52 with the base plate 51. After vulcanization, the first set of outer-band plate 14 are removed from the first compression mold 50. This step is repeated to produce a second set of outer-band halves that will later be used with the first set of outer-band halves to form the compression-molded silicone rings. FIG. 5B shows the outer-band halves removed from the excess silicone material 53, 54, and 55. When an outer-band half 14 is removed from the excess silicone material 53, 54, and 55 a void 56 remains in the remaining excess silicone material 53. Excess silicone material 53, 54, and 55 is discarded or recycled.

Figure 6A:
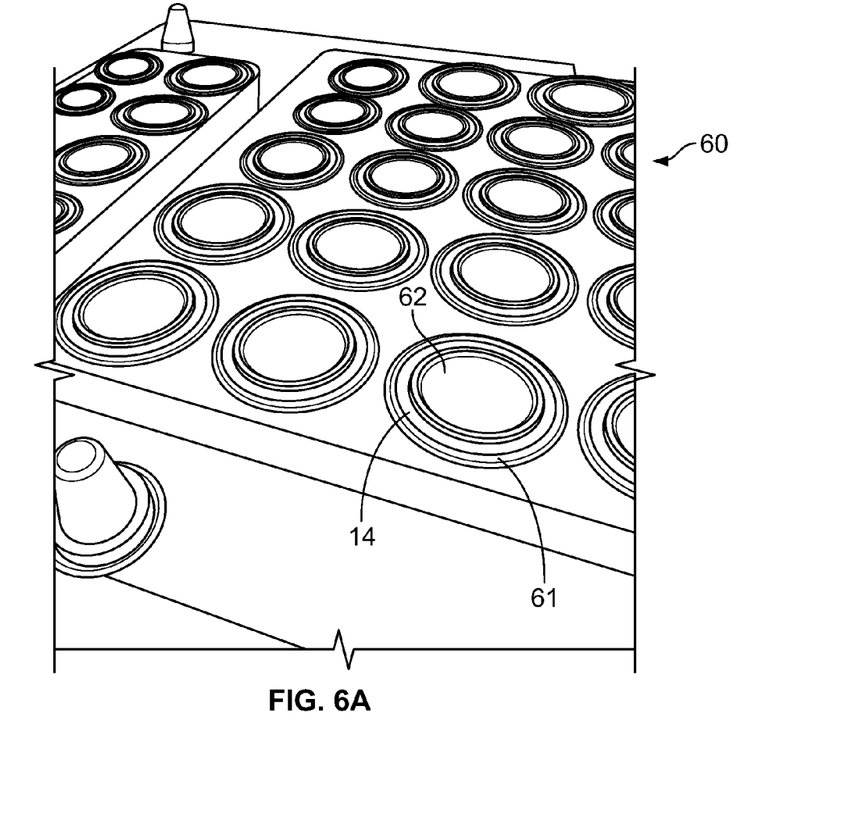
FIG. 6A-6C shows the second compression mold, the spacer-insert mold, and the fourth compression mold used in the process of manufacturing an exemplary embodiment of a compression-molded silicone ring.
Figure 6B:
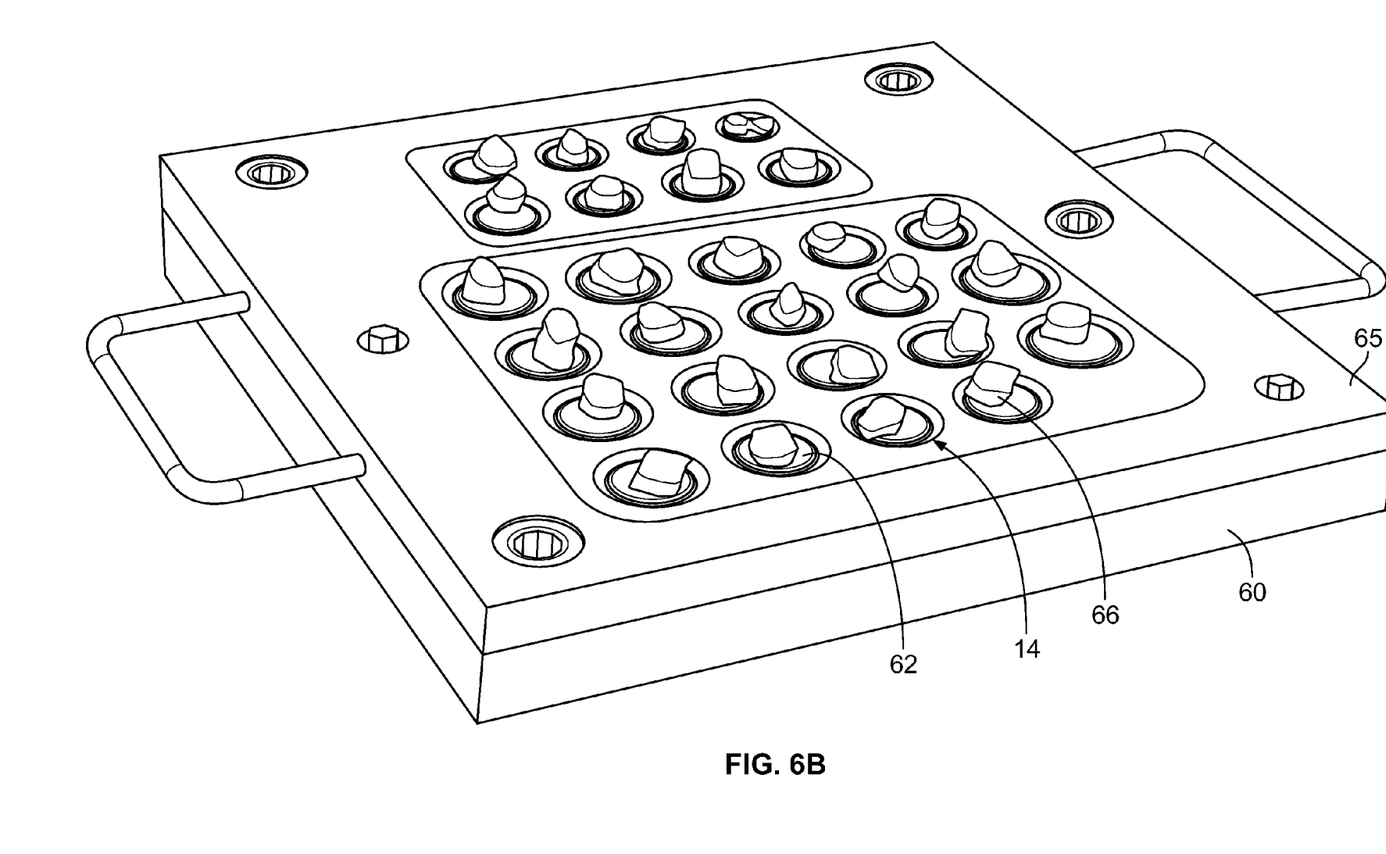
Figure 6C:
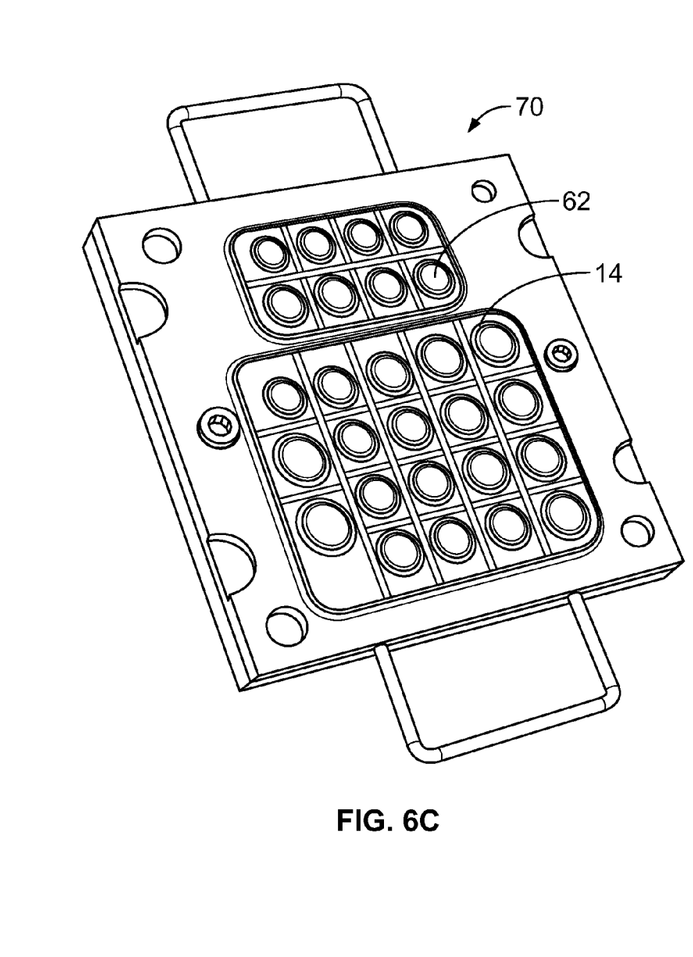
Figure 7:
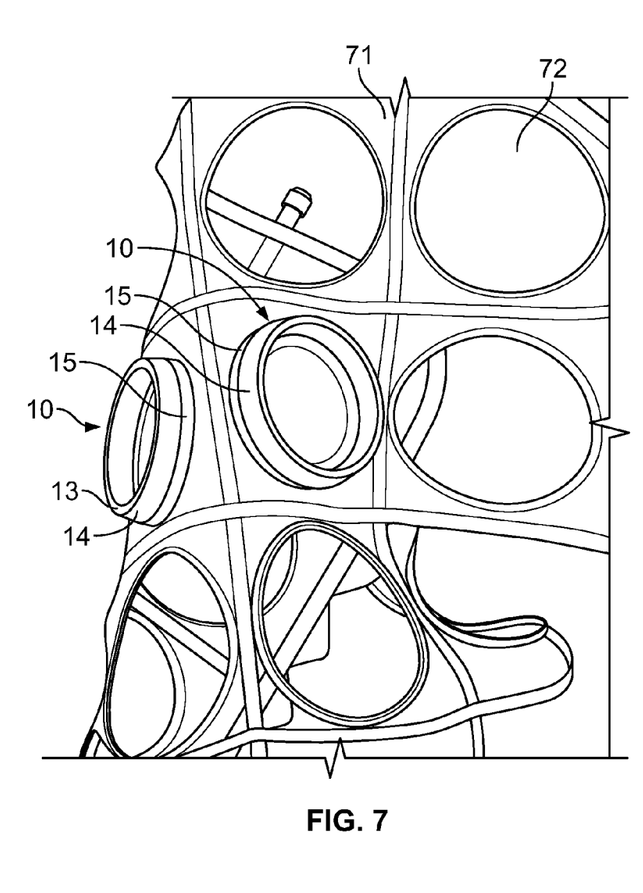
FIG. 7 shows an exemplary embodiment of a compression-molded silicone ring prior to the removal of the excess silicone after the outer-band halves and inner silicone-band have been vulcanized together.

As shown in FIG. 6A, after removal from the first compression mold 50, the outer-band halves 14 are inserted into a second compression mold plate 60. In particular, as shown in FIG. 6A, the outer-band halves 14 are loaded in mold cavities 61 in the second compression mold plate 60. The next step requires that a third compression mold plate, also referred to as a spacer-insert mold plate 65 be placed over the second compression mold plate 60. FIG. 6B depicts spacer-insert mold plate 65 on top of the second compression mold plate 60. As shown in FIG. 6B, silicone rubber, silicone material, or a silicone dough 66, which will form the inner-band of the silicone ring, is then loaded onto cavity platforms 62. Also shown in FIG. 6B are the outer-band halves 14 resident in the second compression mold plate 60. The remaining outer-band halves 14 are loaded into a fourth compression mold plate 70. FIG. 6C depicts the fourth compression mold plate 70 loaded with outer-band halves 14. The fourth mold plate 70 is then placed over the spacer-insert mold plate 65 and the second compression mold plate 60. The stack of three mold plates is then inserted into a compression chamber at a predetermined heat, pressure, and for a specific length of time. The outer-band halves and the inner-band silicone rubber are vulcanized together and then cooled. The finished silicone ring is removed from the molds and any excess silicone material or flash is trimmed from the final product. The final product is the compression-molded silicone ring 10 as depicted in FIG. 7. The silicone ring 10 is removed from the mold leaving void 72 in the excess silicone 71. The excess silicone or flash 71 is trimmed from ring. The finished product includes the two outer-band halves 14 with a center thin-line inner-band 15.

The current disclosure describes a unique method of manufacturing a distinctly multi-colored product from compression-molding of silicone rubber. By using various molds outlined in the example above, a silicone ring with a colored inner band is manufactured. Conventional compression molding techniques cannot be used to create a multicolored silicone ring or other object with distinct and defined colors within the completed product. In conventional methods, when different-colored or pigmented silicone rubbers are compressed together, a blurred or "tie dye" type color pattern emerges as a result of the heat and compression. In one example of the current disclosure, the method of manufacturing a compression-molded silicone ring produces a multi-colored ring with a distinct separation of colors.

The unique compression-molded silicon rings, or methods of making such rings include rings sized in accordance with United States size specifications based upon the ring inner circumference.

These process descriptions are merely exemplary. In certain embodiments, the process may include additional combinations or substitutions of some or all of the steps described above. Moreover, additional and alternative suitable variations, forms and components for the process will be recognized by those skilled in the art given the benefit of this disclosure.

What is claimed is:

1. A method of manufacturing a silicone ring via compression molding comprising:
    forming a first outer-band half of a silicone ring and a second outer-band half of a silicone ring with a first compression mold containing a base plate and a top plate press;
    placing the first outer-band half of the silicone ring in a second compression mold;
    placing a spacer-insert mold over the second compression mold;
    placing a silicone rubber through a cavity in the spacer-insert mold and onto a cavity platform on the second mold;
    placing the second outer-band half of the rings in a third mold;
    placing the third mold over the spacer-insert mold;
    inserting the second mold, the spacer-insert mold, and the fourth mold into a compression chamber, wherein the silicone rubber is compression molded and vulcanized to form an inner-band, and the first and second outer-band halves form a complete silicone ring, and a symmetrical inner-band is formed in between the first and second outer-band halves.

2. The method of claim 1, wherein the pressure used in the molding process to form the inner band is about 120 kg/cm2.

3. The method of claim 1, wherein the pressure used in the molding process to form the outer-band half is about 200 kg/cm$^2$.

4. The method of claim 1, wherein the molds are heated to at least 200 degrees Celsius.

5. The method of claim 1, wherein the molds are compressed for at least three minutes.

6. The method of claim 1, wherein the first and second outer-band halves are composed of a food grade silicone rubber.

7. The method of claim 1, wherein the symmetrical inner-band is composed of a food grade silicone rubber.

8. The method of claim 7, wherein the silicone rubber of the inner band is a different color than the silicone rubber of the first and second outer-band halves.

9. The method of claim 1, wherein at least 1.0 grams of silicone rubber are used to form the first outer-band half and at least 1.0 grams of silicone rubber are used to form the second outer-band half.

10. The method of claim 1, wherein at least 2.0 grams of silicone rubber are inserted through each cavity of the spacer-insert mold to form the inner-band half.

11. The method of claim 1, wherein an excess silicone is removed from the complete ring.

* * * * *